July 29, 1952      E. R. JOYNES      2,604,701
DOUBLE-DIAMETER INDICATOR GAUGE
Filed July 3, 1950
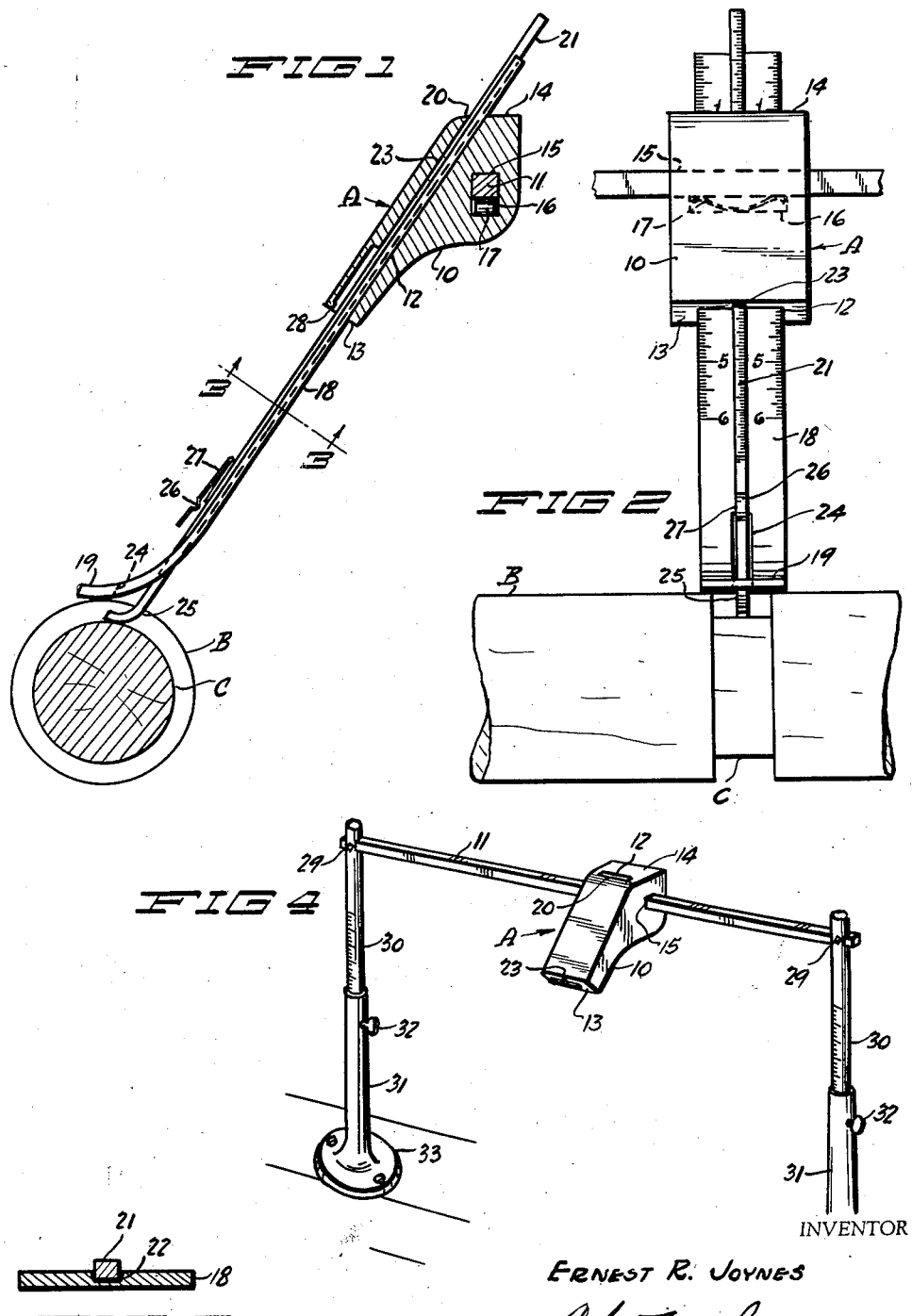
INVENTOR
ERNEST R. JOYNES
BY *A. C. Fisher*
ATTORNEY Patented July 29, 1952

2,604,701

UNITED STATES PATENT OFFICE 2,604,701

DOUBLE-DIAMETER INDICATOR GAUGE

Ernest R. Joynes, Oakland, Calif.

Application July 3, 1950, Serial No. 171,866

2 Claims. (Cl. 33—169)

This invention relates to improvements in indicator gauges for lathes, particularly wood turning lathes.

In turning wood it is frequently necessary to stop the lathe to measure the diameter of the work, and this is complicated where a groove or the like is to be turned in the wood since two dimensions must be taken. This stopping, measuring and restarting the lathe results in a considerable waste of time and electric power, and the primary object of my invention is to provide a continuous reading gauge which will indicate two, major and minor, diameters as the work rotates, thus enabling the operator to dimension the work without stopping the lathe for that purpose.

Another object is to provide a double-diameter indicator gauge of this character which is simple and inexpensive in construction, with gravity operated scales designed to ride the work without scratching or marring the wood and in such fashion as to accurately indicate the diameter.

A further object is to provide an indicator gauge which is easily applied to the lathe and adjusted to the work, with means for conveniently holding the scales out of the way when the indicator is not needed.

These and other objects of the invention will be made apparent in the course of the following specification, reference being had therein to the accompanying drawing, wherein:

Figure 1 is a vertical sectional view through a gauge according to my invention, showing the scales as riding the work.

Figure 2 is a front elevation of the indicator and the work.

Figure 3 is an enlarged cross sectional detail view along the line 3—3 in Figure 1.

Figure 4 is a detail perspective view, on a smaller scale, of the stand and slide for the indicator scales.

Referring now more particularly and by reference characters to the drawing, A designates generally the indicator gauge of my invention and it comprises a carrier or body member 10 slidably mounted upon a square support rod or slide 11, which, as will presently appear, is arranged behind the lathe, horizontally and parallel with the work to be measured. As shown in the drawing, the work B is a piece of wood being turned in the lathe and it has a groove C chosen to illustrate the double-diameter measuring.

The carrier 10 inclines downwardly and forwardly toward the work and has a correspondingly inclined slot 12 which opens through the lower end 13 and upper, horizontally faced end 14 of the carrier. The cross passage 15 for the slide 11 is recessed at 16 to receive a bowed spring 17 to bear on the slide and thus hold the carrier 10 in any adjusted position along the slide, while permitting the carrier to be conveniently moved as required to line up the same with the work. Slidable upwardly and downwardly through the slot 12, in an inclined plane toward and away from the work, is a main or major diameter indicating scale 18, suitably graduated at its edges, and curved forwardly and upwardly at its lower end 19 to ride the upper surface of the work B without interfering with the rotation thereof by the lathe, digging into the wood, or marking the same in any way. This scale 18 is heavy enough to drop by gravity upon the work and an accurate indication of the work diameter, on its major diameter, may be continuously read from the scale graduations as viewed at the forward upper edge 20 of the slot 12. The width of this scale 18 is further such that it will span a groove C of substantial length as clearly shown in Figure 2.

For the slidable accommodation of a narrower second or minor scale 21 the just described main, major scale 18 is provided with a longitudinally extending center groove 22 in which said second scale rests. The slot 12 also has an upper groove 23 to fit this second scale 21 where it projects upward beyond the face of the main scale. Adjacent the lower end 19 the main scale is formed with an opening 24 and the second scale may drop therethrough so as to ride the minor groove diameter of the work, also as clearly shown. This lower end of the second scale 21 is also curved forwardly and upwardly at 25 to ride the work without digging in and continuously indicate this minor diameter by a reading taken from suitable graduations upon the scale. The minor scale 21 has graduations to be read at the upper end of the major scale 18.

When not in use, the scales 18 and 21 may be thrust up into the carrier 10 and hold by engaging a notch 26 in a spring 27, affixed to the scale 21, with a depending lip 28 at the upper edge of the slot 12 where same opens through the lower end 13 of the carrier. When so engaged, the spring 27 will bind the scales in the carrier slot but the spring may be easily pressed down to clear the lip 28 and allow the scales to drop of their own weight down to the work when required.

While the carrier rod 11 may be supported in any suitable fashion on the lathe, I show the rod in Figure 4 as secured by set screws 29 in the upper ends of support standards 30 telescoped down into stands 31. Wing screws 32 then may be used to hold the rod 11 at any desired elevation and as shown at the left the stands 31 may be provided with bases 33 to screw to the lathe base or work bench. The standards 30 are graduated as shown in Figure 4 to facilitate setting up and resetting the height of the indicator.

The utter simplicity of the gauge will be apparent from the foregoing, and it will further be evident that by proper adjustment and positioning the gauge will continuously indicate two different diameters of the work as it is turned, effecting a very considerable saving in time. Since the scales operate by gravity and have curved ends to ride the work they will give accurate readings without marring or marking the wood.

Having now, therefore, fully described my invention, it is understood that I may vary from the specific disclosures without departing from the spirit of the invention and within the scope of the appended claims.

I claim:

1. In a gauge of the character described for use in a carrier and operative to simultaneously indicate the diameter of work being turned in a lathe and indicate the diameter of a groove turned in the work, the improvement which comprises a main graduated scale slidable on the carrier and a second scale slidable at the center of the main scale, the second scale being narrower than the main scale to enter a groove turned in the work and both scales having curved lower ends to ride the work, and the wider main scale having an opening in its curved lower end to pass the lower end of the second scale.

2. In an indicating gauge of the character described, an upright carrier having a slot from top to bottom, a main scale slidable down through the slot, a second scale slidable through the slot down along the center of the main scale, the carrier having a lip at the lower end of said slot, and a spring on the second scale having a notch to engage said lip and press both scales against the slot and hold the scales against the slot and hold the scales up in the carrier.

ERNEST R. JOYNES.

REFERENCES CITED

The following references are of record in the file of this patent:

UNITED STATES PATENTS

| Number | Name | Date |
|---|---|---|
| 750,449 | Gillard | Jan. 26, 1904 |
| 1,317,227 | Scusa | Sept. 30, 1919 |
| 1,765,624 | Scusa | June 24, 1930 |

FOREIGN PATENTS

| Number | Country | Date |
|---|---|---|
| 456,513 | Germany | Feb. 24, 1928 |
| 334,222 | Italy | Jan. 23, 1936 |